US007529153B2

(12) United States Patent  (10) Patent No.: US 7,529,153 B2
Watanabe et al.  (45) Date of Patent: May 5, 2009

(54) POSITIONAL INFORMATION DETECTING METHOD AND DEVICE

(75) Inventors: Takamoto Watanabe, Nagoya (JP); Sumio Masuda, Tokyo (JP)

(73) Assignee: DENSO CORPORATION, Kariya (JP)

( * ) Notice: Subject to any disclaimer, the term of this patent is extended or adjusted under 35 U.S.C. 154(b) by 252 days.

(21) Appl. No.: 11/501,919

(22) Filed: Aug. 10, 2006

(65) Prior Publication Data

US 2007/0203667 A1 Aug. 30, 2007

(30) Foreign Application Priority Data

Feb. 24, 2006 (JP) .............................. 2006-048533

(51) Int. Cl.
G01S 3/80 (2006.01)
G01B 21/02 (2006.01)
(52) U.S. Cl. ...................... 367/125; 367/124; 367/127; 702/158
(58) Field of Classification Search ................ 367/118, 367/123–125, 127; 702/66, 155, 158, 159
See application file for complete search history.

(56) References Cited

U.S. PATENT DOCUMENTS 6,192,751 B1 * 2/2001 Stein et al. ................ 73/290 V 2005/0047526 A1 3/2005 Watanabe et al.

FOREIGN PATENT DOCUMENTS

JP H08-170909 7/1996
JP 2005-102129 4/2005

* cited by examiner

Primary Examiner—Ian J Lobo
(74) Attorney, Agent, or Firm—Posz Law Group, PLC

(57) ABSTRACT

In a positional information detecting device, a tone-burst signal propagating unit causes a tone-burst signal to propagate through a path. The tone-burst signal is composed of a continuous wave train, the continuous wave train including a plurality of cycles of a constant frequency. A detecting unit detects, at a predetermined position in the path, the tone-burst signal propagating through the path every one cycle of the tone-burst signal to measure a propagation delay time based on the detected signal. The propagation delay time represents a period for which the tone-burst signal has propagated through the path. A phase obtaining unit obtains a phase of the detected signal. A positional information obtaining unit obtains positional information associated with the predetermined position based on the measured propagation delay time and the obtained phase of the detected signal.

12 Claims, 10 Drawing Sheets

US 7,529,153 B2

POSITIONAL INFORMATION DETECTING METHOD AND DEVICE

CROSS REFERENCE TO RELATED APPLICATIONS

This application is based on Japanese Patent Application 2006-048533 filed on Feb. 24, 2006. This application claims the benefit of priority from the Japanese Patent Application, so that the descriptions of which are all incorporated herein by reference.

FIELD OF THE INVENTION

The present invention relates to positional information detecting methods and devices, which are designed to detect positional information using a tone burst signal that is composed of a continuous wave train consisting of several cycles of a constant frequency over a constant period.

BACKGROUND OF THE INVENTION

Distance measuring technique using an ultrasonic wave propagative in the atmosphere and/or a liquid or an elastic wave propagative in a solid is conventionally known, an example of which is disclosed in Japanese Unexamined Patent Publication.

Specifically, such distance measuring technique can measure the distance of a point from which the waves have been transmitted to a target from which they are reflected based on a propagation delay time of the waves between the point and the target.

A distance measuring device designed to use the technique is commonly configured to generate, at an arbitrary generation time, a tone burst signal composed of a continuous wave train consisting of several cycles of a constant frequency over a constant period. The distance measuring device is commonly provided with a detector located in a propagation path of the tone burst signal. The detector is configured to detect the propagating tone burst signal.

The distance measuring device is also commonly configured to:

monitor the level of the tone burst signal being detected by the detector;

determine a detection time at which the monitored level reaches a predetermined level;

calculate, as a propagation delay time, the difference between the generation time and the detection time; and obtain a propagation distance of the tone burst signal by multiplying the propagation delay time by a propagation velocity of the tone burst signal.

In such a distance measuring device, the detected tone burst signal is digitized to downsize the device and/or to enhance the performance of the device. When the detected tone burst signal is sampled at a predetermined period and converted to an equivalent digital signal, the resolution of the detection signal and therefore the distance to be measured based on the tone burst signal are defined by the sampling period of the tone burst signal.

Specifically, in the distance measuring device designed to measure a distance based on a detected tone burst signal in the form of digital data, the sampling period will have to be shorter, in other words, the sampling frequency will have to be higher in order to improve the resolution of the distance to be measured. This may require an A/D converter and the like, which are operable at a high sampling frequency, causing the distance measuring device to increase in complexity and in cost.

In addition, in the above-mentioned method of determining the detection time based on the monitored level of the detected tone burst signal, the accuracy of determining the detection time may be susceptible to the strength of the propagating tone burst signal, in other words, the level of the detected tone burst signal and/or noise superimposed on the detected tone burst signal. This may reduce the reliability of measurement results of the distance measuring device.

The reasons for the reduction of the reliability are probably as follows.

Specifically, if the tone burst signal has not reached the detector yet, but a noise signal with large amplitude enters the detector, the detector would erroneously determine that the tone burst signal has already reached the detector upon entry of the noise signal.

In addition, if the tone burst signal has already reached the detector, but a noise signal out of phase with the tone burst signal enters the detector so that it reduces the level thereof, the detector would also erroneously determine that the tone burst signal has not reached the detector yet.

SUMMARY OF THE INVENTION

In view of the background, an object of at least one aspect of the present invention is to improve the resolution of positional information of a target, such as a distance thereof, to be detected using a tone burst signal.

According to one aspect of the present invention, there is provided a positional information detecting method. The method includes causing a tone-burst signal to propagate through a path. The tone-burst signal is composed of a continuous wave train. The continuous wave train includes a plurality of cycles of a constant frequency. The method includes detecting, at a predetermined position in the path, the tone-burst signal propagating through the path every one cycle of the tone-burst signal to measure a propagation delay time based on the detected signal. The propagation delay time represents a period for which the tone-burst signal has propagated through the path. The method includes obtaining a phase of the detected signal, and obtaining positional information associated with the predetermined position based on the measured propagation delay time and the obtained phase of the detected signal.

According to another aspect of the present invention, there is provided a positional information detecting device. The device includes a tone-burst signal propagating unit configured to cause a tone-burst signal to propagate through a path. The tone-burst signal is composed of a continuous wave train. The continuous wave train includes a plurality of cycles of a constant frequency. The device includes a detecting unit configured to detect, at a predetermined position in the path, the tone-burst signal propagating through the path every one cycle of the tone-burst signal to measure a propagation delay time based on the detected signal. The propagation delay time represents a period for which the tone-burst signal has propagated through the path. The device includes a phase obtaining unit configured to obtain a phase of the detected signal, and a positional information obtaining unit configured to obtain positional information associated with the predetermined position based on the measured propagation delay time and the obtained phase of the detected signal.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings.

Figure 1:
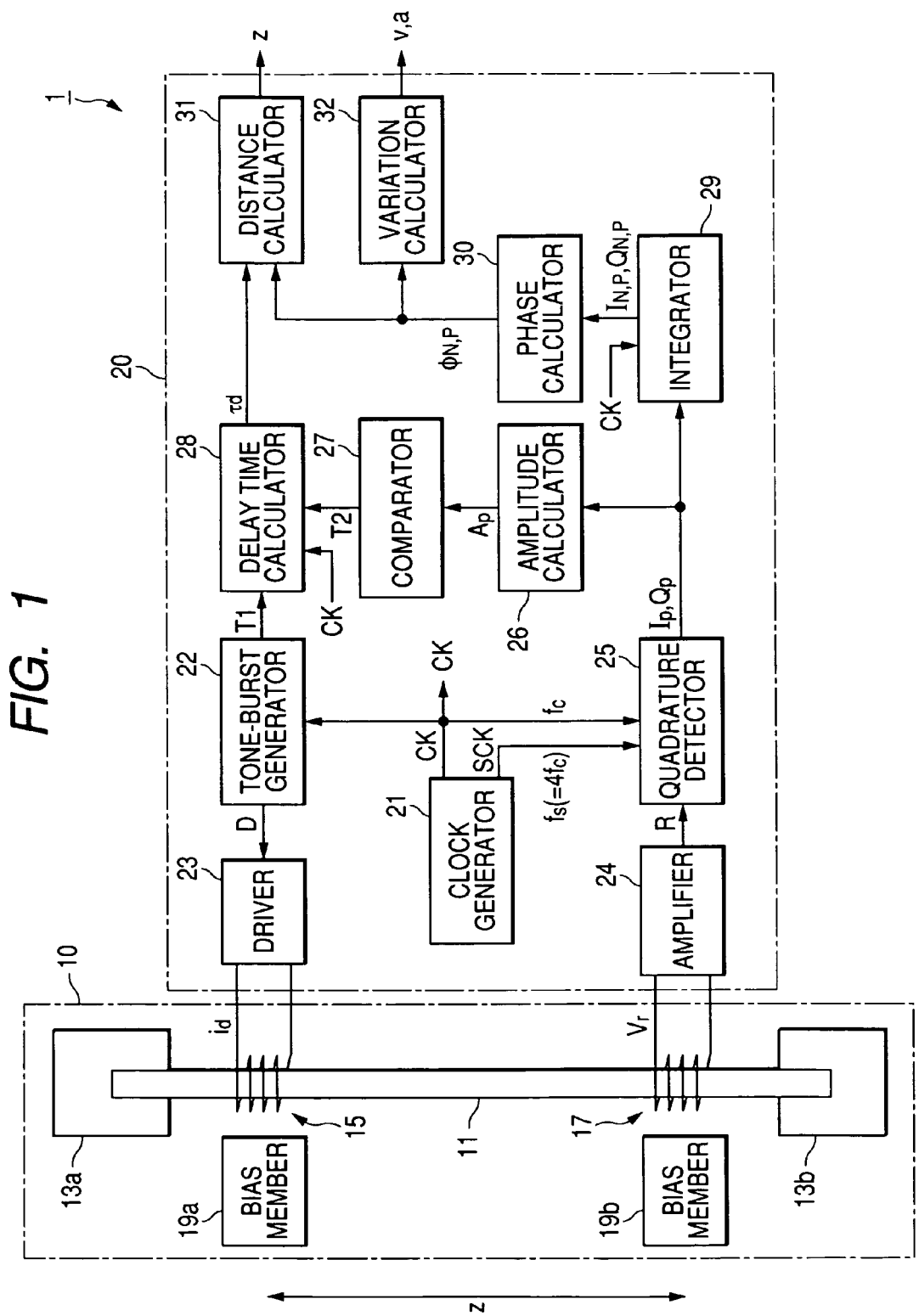
FIG. 1 is a block diagram schematically illustrating an example of the overall structure of a position sensor according to an embodiment to which the present invention is applied.

Referring to the drawings, in which like reference characters refer to like parts in several views, FIG. 1 illustrates an example of the overall structure of a position sensor 1 according to the embodiment to which the present invention is applied.

As illustrated in FIG. 1, the position sensor 1 is provided with a sensor module 10 designed to use magnetoelastic-wave propagation to measure positional information of a target. The position sensor 1 is also provided with a signal-processing unit 20 operative to drive the sensor module 10 and to process signals sensed by the sensor module 10 driven thereby.

The sensor module 10 is composed of:

an amorphous wire 11 serving as a medium for generating magnetoelastic waves and for propagating them;

a pair of wire holders 13a and 13b that hold both tips of the amorphous wire 11, respectively;

an excitation coil 15 fixedly wound around one end of the amorphous wire 11, for example, close to the wire holder 13a in this embodiment, and operative to generate alternating magnetic field to be applied to the amorphous wire 11;

a detection coil 17 that is:

wound around the intermediate portion of the amorphous wire 11 between the excitation coil 15 and the wire holder 13b to be movable along the axial direction (the longitudinal direction) Z of the wire 11 (the axial direction will be referred to simply as "wire axial direction" hereinafter), and operative to sense an induced voltage $v_r$ generated by a magnetoelastic wave propagating in the amorphous wire 11; and a pair of bias applying members 19a and 19b respectively composed of a bias coil or a permanent magnet and configured to generate DC (Direct-Current) bias field along the wire axial direction of the amorphous wire at its respective mounted positions of the excitation and detection coils 15 and 17 in the amorphous wire 11. In FIG. 1, the bias applying members 19a and 19b are simply referred to as "bias members".

The amorphous wire 11 consists of a Fe—Si—B wire with positive magnetostriction. Specifically, when an alternating magnetic field biased by the DC bias fields along the wire axial direction is applied to a portion of the amorphous wire 11, the amorphous wire 11 works to generate, at the magnetic-field applied portion, magnetostrictive vibration with a frequency equivalent to that of the alternating magnetic field. The magnetostrictive vibration causes magnetoelastic waves, and the magnetoelastic waves are propagated in the amorphous wire 11.

At least part of the wire holder 13a disposed close to the excitation coil 15 is made from an elastic-wave absorber, such as a robber member; this part of the wire holder 13a is arranged to abut on the amorphous wire 11.

For example, the detection coil 17 is fixedly mounted on the target to be movable together with the target.

With the sensor module 10, when an alternating drive current $i_d$ supplied from the signal-processing unit 20 flows through the excitation coil 15, the excitation coil 15 creates an alternating magnetic field. The created alternating magnetic field generates magnetoelastic waves that propagate along the wire axial direction from the excitation-coil mounted position of the amorphous wire 11.

The created magnetoelastic waves travel toward the respective tips of the amorphous wire 11. One of the magnetoelastic waves traveling toward one tip of the amorphous wire 11 to which the wire holder 13a is attached is absorbed by the wire holder 13a.

The other of the magnetoelastic waves traveling toward the other tip of the amorphous wire 11 to which the wire holder 13b is attached passes through the excitation-coil mounted position of the amorphous wire 11, and is reflected by the wire holder 13b. The reflected magnetoelastic wave then reversely travels toward one tip of the amorphous wire 11 to which the wire holder 13a is attached so that it is finally absorbed by the wire holder 13a.

When the magnetoelastic wave passes through the detection-coil mount position of the amorphous wire 11, an induced voltage $v_r$ is created across the detection coil 17 based on inverse magnetostrictive effect of the amorphous wire 11; this induced voltage $v_r$ has a frequency equivalent to that of the magnetoelastic wave. The induced voltage $v_r$ is supplied to the signal-processing unit 20.

Note that the induced voltage $v_r$ has a waveform substantially similar to that of the drive current $i_d$ to be supplied to the excitation coil 15. The induced voltage $v_r$ is delayed in phase from the drive current $i_d$ by a propagating time required for the magnetoelastic wave to travel from the excitation-coil mount position to the detection-coil mount position of the amorphous wire 11.

Next, the signal-processing unit 20 is composed of a clock generator 21, a tone-burst generator 22, a driver 23, an amplifier 24, and a quadrature detector 25.

The clock generator 21 is operative to generate:

a reference signal (clock signal) CK, which consists of a repetitive series of clock pulses, with a frequency (clock frequency) $f_c$, referred to as carrier frequency, and a sampling signal (a repetitive series of sampling clock pulses) SCK with a frequency (sampling frequency) $f_s$ that is four times higher than the carrier frequency $f_c$ of the clock signal CK, in other words, the sampling frequency $f_s$ is equivalent to $4f_c$.

The tone-burst generator 22 is operative to perform amplitude shift keying (ASK) modulation (on/off modulation) on a carrier wave periodically oscillating positively and negatively in time according to the carrier frequency $f_c$, thereby generating a tone-burst drive signal D. The tone-burst drive signal D is composed of a continuous wave train consisting of several cycles of the carrier frequency $f_c$ as a constant frequency over a constant period $T_b$.

The driver 23 is operative to supply the drive current $i_d$ to the excitation coil 15 based on the drive signal D created by the tone-burst generator 22.

The amplifier 24 is operative to amplify the induced voltage $v_r$ fed from the detection coil 17 to generate a detection signal (voltage signal) R that periodically oscillates positively and negatively in time, the cycle of which is equivalent to the carrier cycle $T_c$.

The quadrature detector 25 is operative to perform quadrature detection of the detection signal R to generate an in-phase component $I_p$ and a quadrature-phase component $Q_p$ of the detection signal R every carrier cycle ($T_c$), where p=1, 2, 3, . . . , i.e. p represents the generation order of the in-phase and quadrature-phase components that have been sequentially generated based on respective carrier cycles. The carrier cycle ($T_c$) can be described as "$1/f_c$" and is equivalent to one cycle of the clock signal CK.

Figure 2:
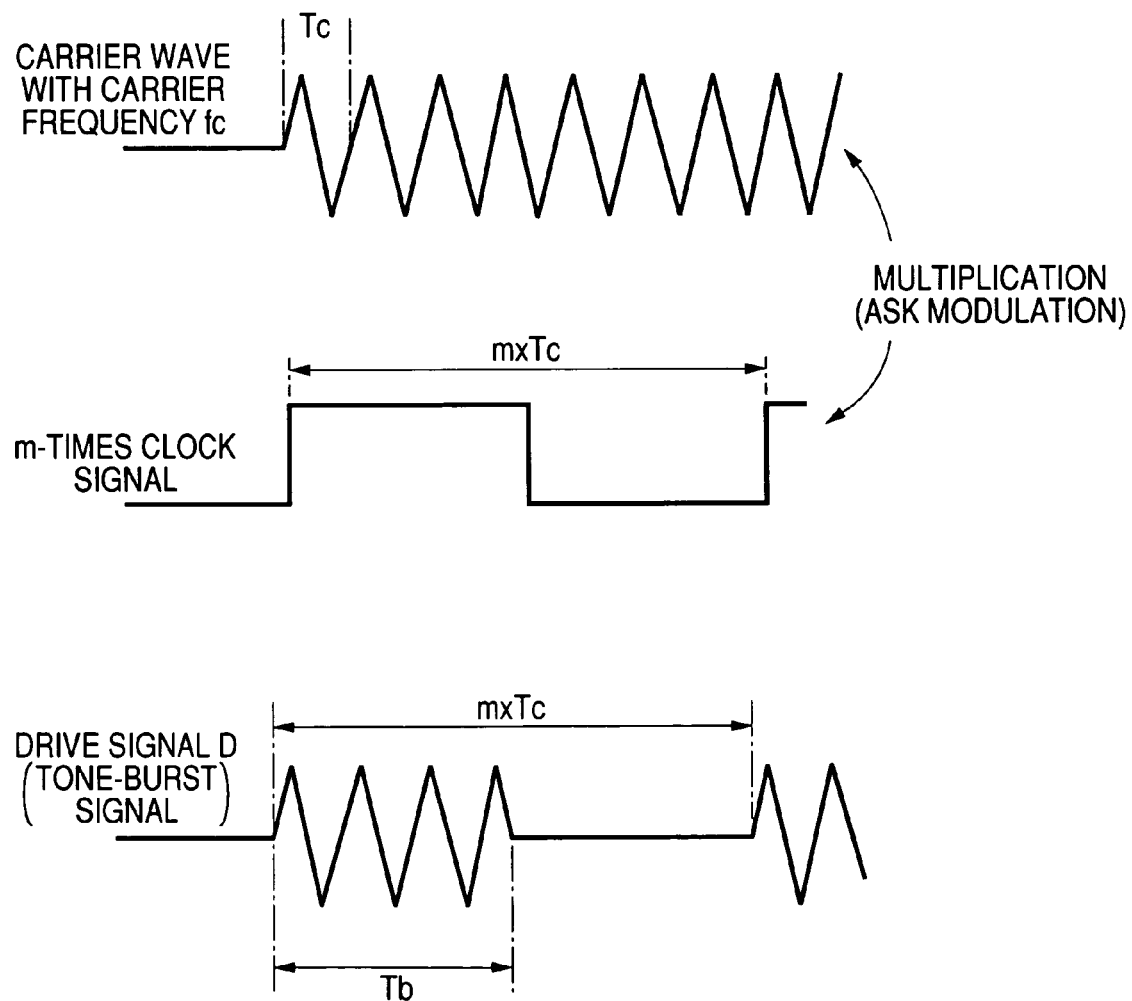
FIG. 2 is a waveform diagram schematically illustrating operations of a tone-burst generator of the position sensor illustrated in FIG. 1.

As the carrier wave, a sinusoidal wave with the carrier frequency $f_c$ is used as an example. Specifically, as illustrated in FIG. 2 for example, the tone-burst generator 22 is designed to multiply the carrier wave by an m-times clock signal whose cycle is m times as long as the carrier cycle $T_c$ of the clock signal CK, thereby generating the tone-burst drive signal D. The tone-burst drive signal D is composed of a continuous wave train, that is, a sinusoidal wave train, consisting of several cycles of the carrier frequency $f_c$ over the constant period $T_b$ corresponding to the half of the cycle m·$T_c$ of the m-times clock signal.

The quadrature detector 25 is constructed by a plurality of CMOS digital elements, and designed to provide digital quadrature detection.

Figure 3:
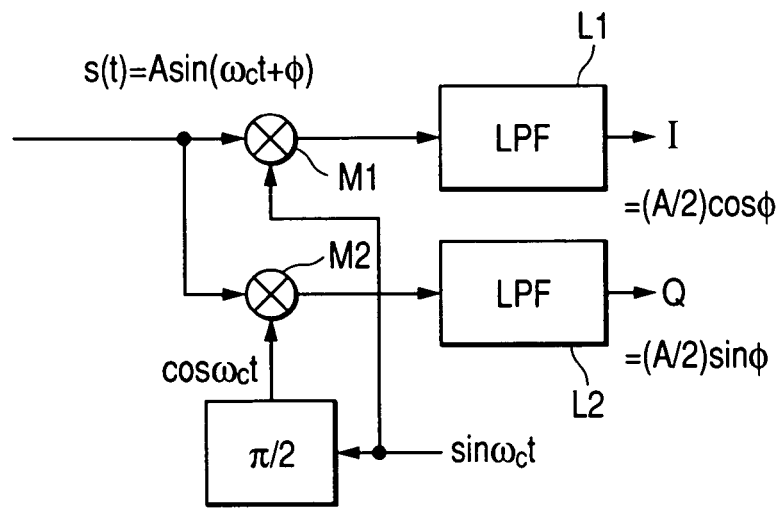
FIG. 3 is a circuit diagram schematically illustrating quadrature detection.

Quadrature detection is normally configured, as illustrated in FIG. 3 for an example, to:

a first multiplier M1 for multiplying a modulated carrier wave s(t) modulated by a baseband signal (target signal), which is represented as "s(t)=A sin($2\pi f_c t+\phi$)", by a sinusoidal wave (sin($2\pi f_c t$));

a second multiplier M2 for multiplying the modulated carrier wave s(t) by a cosine wave (cos($2\pi f_c t$)) shifted in phase from the sinusoidal wave by $\pi/2$ (radian);

a first low pass filter (LPF) L1 for allowing a low-frequency component of the multiplied carrier wave sent from the first multiplier M1 to pass therethrough while restricting the higher-frequency component thereof to generate an in-phase component I(=(A/2)cos $\phi$); and a second low pass filter L2 for allowing a low-frequency component of the multiplied carrier wave sent from the second multiplier M2 to pass therethrough while restricting the higher-frequency component thereof to generate a quadrature-phase component Q (=(A/2)sin $\phi$), where $f_c$ is a carrier frequency of the carrier wave, A is an amplitude of a baseband signal (modulating signal), which is unknown, and $\phi$ is a phase of the baseband signal, which is unknown.

Figure 4:
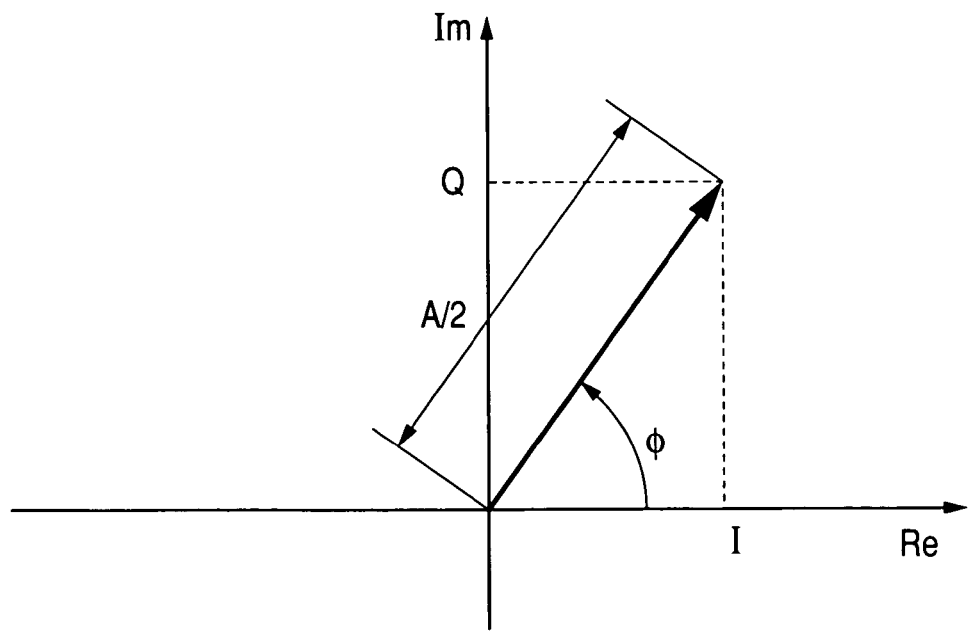
FIG. 4 is a graph schematically illustrating an in-phase component and a quadrature-phase component generated by the quadrature detection illustrated in FIG. 3.

The in-phase component I and the quadrature-phase component Q are shown on the rectangular coordinates illustrated in FIG. 4. Note that the horizontal axis (Re) represents the real part of a complex vector, and the vertical axis (Im) represents the imaginary part of the complex vector. Specifically, the in-phase component I represents the real part of the vector (A/2+j$\phi$) shown on the complex plane as the amplitude A and the phase $\phi$, and the quadrature-phase component Q represents the imaginary part of the vector (A/2+j$\phi$).

Thus, obtaining the in-phase component I and the quadrature-component Q of the modulated carrier wave s(t) allows the unknown amplitude A and the unknown phase $\phi$ of the baseband signal to be calculated.

As described above, the quadrature detection has been normally carried out using analog circuits.

In the embodiment, however, in place of the normal quadrature detection design set forth above, using the quadrature detector 25 permits the digital quadrature detection to be simply carried out.

Figure 5:
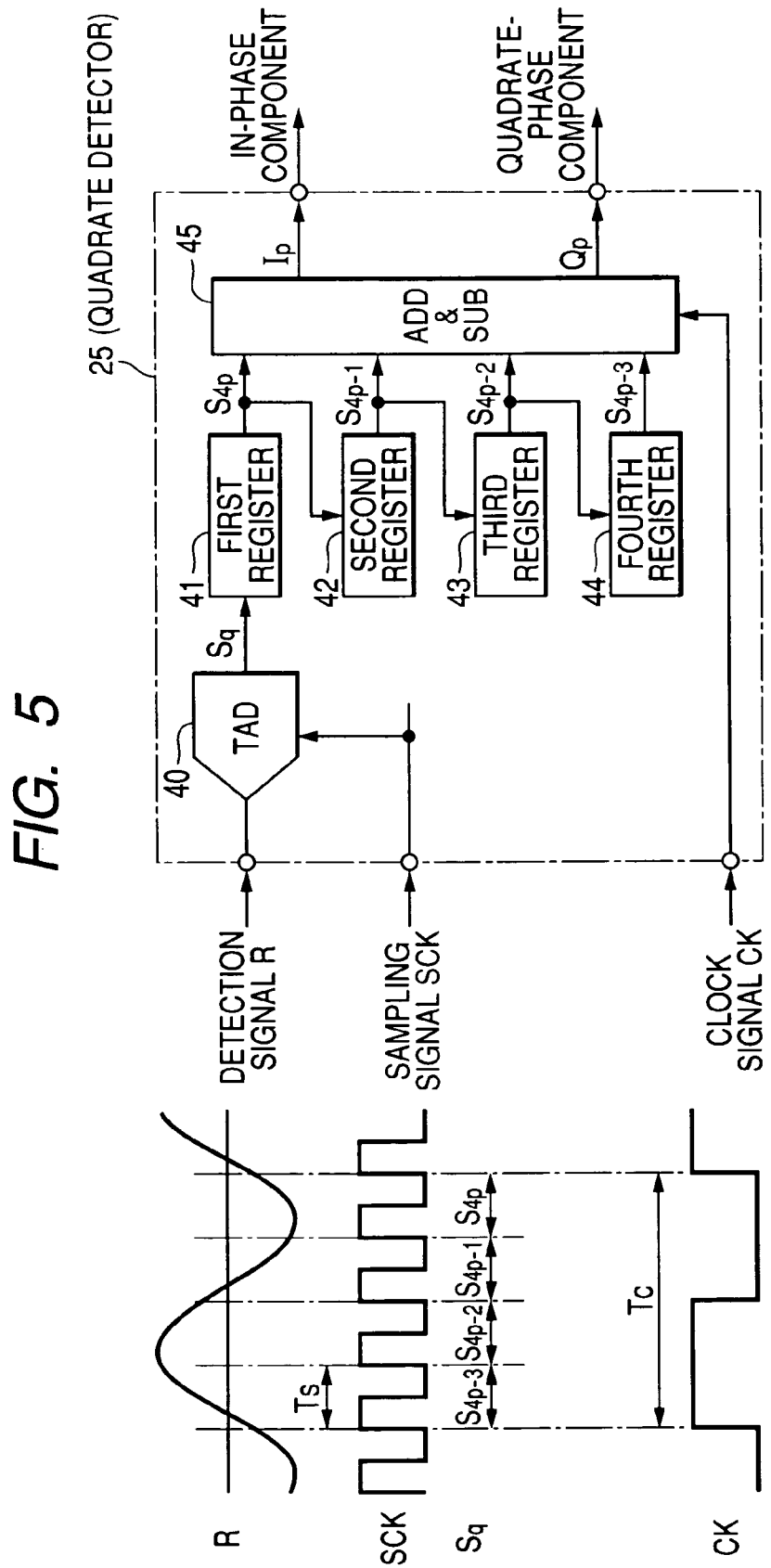
FIG. 5 is a block diagram schematically illustrating an example of the overall structure of a quadrature detector illustrated in FIG. 1.

Specifically, as illustrated in FIG. 5, the quadrature detector 25 is composed of a time analog to digital (A/D) converter 40 operative to average (integrate) the detection signal R over every sampling cycle $T_s$, thereby obtaining an average value (integration value) $S_q$ (q=1, 2, 3, . . . ) every sampling cycle $T_s$. The sampling cycle $T_s$ is equivalent to $1/f_s(=\frac{1}{4}f_c=T_c/4)$ and is equivalent to one cycle of the sampling signal SCK supplied from the clock generator 21. The time A/D converter will be referred to simply as "TAD" hereinafter.

The quadrature detector 25 is also composed of first to fourth registers 41 to 44 each with an input and an output, and an adder-subtractor 45. In FIG. 5, the adder-subtractor 45 is simply referred to as "ADD & SUB". The input of the first register 41 is connected to an output of the TAD 40, and the output thereof is connected to both the input of the second register 42 and the adder-subtractor 45. The output of the second register 42 is connected to both the adder-subtractor 45 and the input of the third register 43, and the output of the third register 43 is connected to both the adder-subtractor 45 and the input of the fourth register 44. The output of the fourth register 44 is connected to the adder-subtractor 45.

When an average value $S_{4p-3}$ is output from the TAD 40 in synchronization with one sampling clock pulse of the sampling signal SCK, the average signal $S_{4p-3}$ is input to the first register 41 to be latched therein. When the next average value $S_{4p-2}$ is output from the TAD 40 in synchronization with the next sampling clock pulse of the sampling signal SCK, the average value $S_{4p-3}$ latched in the first register 41 is shifted to the second register 42 to be latched therein, and the average value $S_{4p-2}$ is input to the first register 41 to be latched therein.

When the next average value $S_{4p-1}$ is output from the TAD 40 in synchronization with the next sampling clock pulse of the sampling signal SCK, the average value $S_{4p-3}$ latched in the second register 42 is shifted to the third register 43 to be latched therein, the average value $S_{4p-2}$ latched in the first register 41 is shifted to the second register 42 to be latched therein, and the average value $S_{4p-1}$ is input to the first register 41 to be latched therein.

When the next average value $S_{4p}$ is output from the TAD 40 upon application of the next sampling clock pulse of the sampling signal SCK, the average value $S_{4p-3}$ latched in the third register 43 is shifted to the fourth register 44 to be latched therein, the average value $S_{4p-2}$ latched in the second register 42 is shifted to the third register 43 to be latched therein, the average value $S_{4p-1}$ latched in the first register 41 is shifted to the second register 42 to be latched therein, and the average value $S_{4p}$ is input to the first register 41 to be latched therein.

The adder-subtractor 45 is operative to sample the integration values $S_{4p-3}$ to $S_{4p}$ and to perform addition and subtraction on the four sampled integration values $S_{4p-3}$ to $S_{4p}$.

Figure 6:
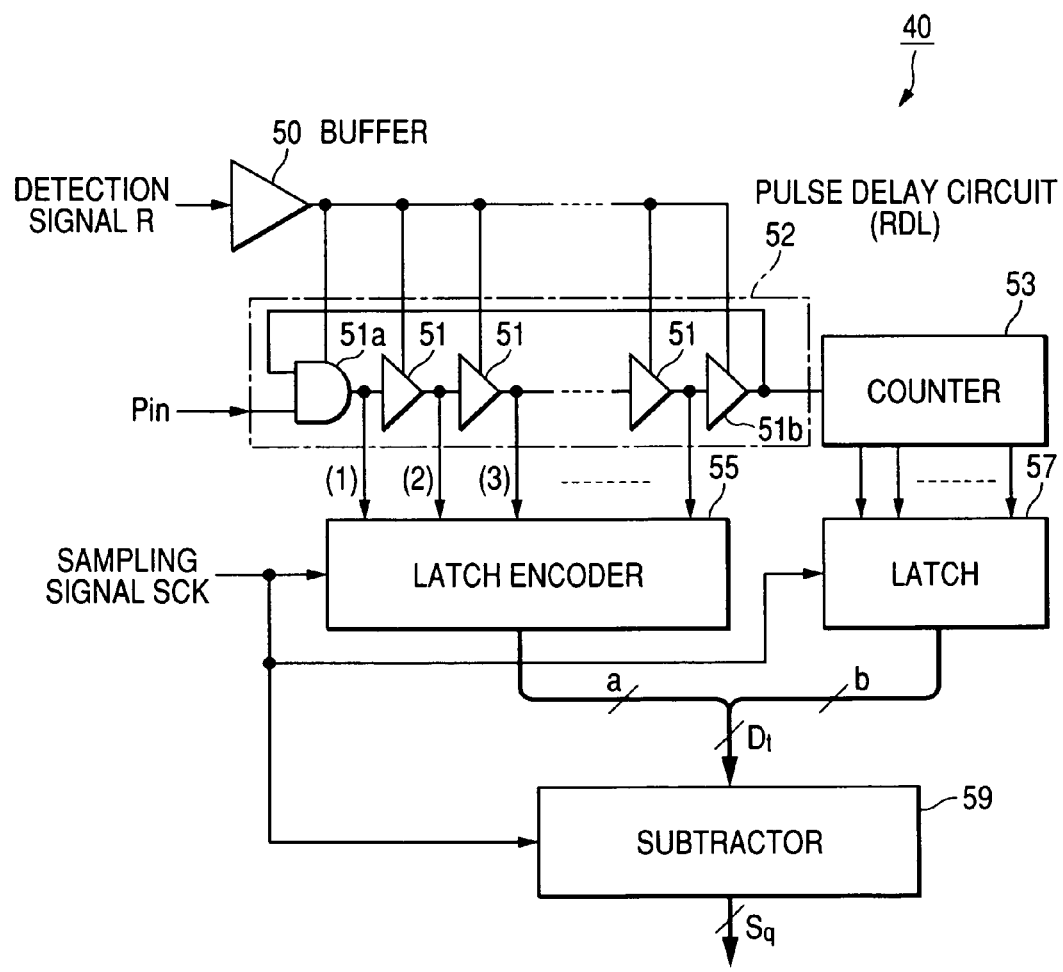
FIG. 6 is a block diagram schematically illustrating an example of the overall structure of a time analog to digital converter illustrated in FIG. 5.

The TAD 40 as illustrated in FIG. 6 includes a pulse delay circuit, in other words, a ring delay line (RDL) 52. The pulse delay circuit 52 is composed of a plurality of delay units 51 that corresponds to a plurality of stages of delay. The delay units 51 are serially connected to one another in a ring-like structure. Specifically, the first stage of the delay units 51 to which reference character "51a" is assigned is an AND gate having one and the other input terminals. A start pulse signal $P_{in}$ is configured to be input to the one input terminal of the AND gate 51a. The other input terminal of the AND gate 51a is connected to an output terminal of the final stage 51b of the delay units 51.

When the pulse signal $P_{in}$ is input to the AND gate 51a through its one input terminal, a pulse signal is sequentially transferred by the delay units 51 while being delayed thereby in the order from the AND gate 51a toward the final stage 51b of the delay units 51. When the pulse signal reaches the final stage 51b of the delay units 51, it is returned to the first stage 51a of the delay units 51 through it's other input terminal. For this reason, the pulse signal is circulated through the delay units 51.

The TAD 40 includes a counter 53 connected to the output terminal of the final stage 51b of the delay units 51 and operative to count the number of times of circulation of the pulse signal through the circularly-connected delay units 51.

The TAD 40 includes a latch encoder 55 operative to:

latch a position where the pulse signal has reached at timing of a significant edge, such as leading edge (or trailing edge), of each sampling clock pulse of the sampling signal SCK; and convert the latched position of the pulse signal Pin into predetermined bits of digital data that represent what number of stage (delay unit 51) through which the pulse signal located at the latched position lastly passes from the first stage 51a.

The TAD 40 includes a latch 57 operative to:

latch the count value of the counter 53 at timing of a significant edge, such as leading edge (or trailing edge), of each sampling clock pulse of the sampling signal SCK; and convert the latched count value into predetermined bits of digital data.

The TAD 40 includes a subtractor 59. When the predetermined bits of digital data are input to the subtractor 59 from the latch encoder 55 as lower-order bits "a" of digital data Dt, and the predetermined bits of digital data are input thereto from the latch 57 as higher-order bits "b" of the digital data Dt, the subtractor 59 works to latch the input digital data Dt at timing of a significant edge, such as leading edge (or trailing edge), of each sampling clock pulse of the sampling signal SCK.

The subtractor 59 also works to obtain the difference between the current latched input digital data Dt and the previous latched input digital data that has been latched one sampling clock pulse before the current latched input digital data Dt, thereby outputting the obtained difference as the average value (integration value) $S_q$.

Each of the delay units 51 constituting the pulse delay circuit 52 is composed of a gate circuit consisting of, for example, an inverter and/or other electronic logic gates.

The TAD 40 includes a buffer 50 to which the detection signal R is configured to be input. The detection signal R output from the amplifier 24 is configured to be applied to each of the delay units 51 as a power supply voltage.

The delay time of each delay unit 51 depends on the voltage level of the power supply voltage (the detection signal R) supplied to each delay unit 51. Specifically, the delay time of each delay unit 51 is inversely proportional to the voltage level of the power supply voltage (the detection signal R) supplied to each delay unit 51.

For this reason, the output of the subtractor 59, that is, data representing the number of delay units 51 through which the pulse signal passes within every sampling cycle $T_s$ is substantially proportional to the average value (integration value) $S_q$ obtained by averaging (integrating) the voltage level of the detection signal R over every sampling cycle $T_s$.

Note that, for example, the input voltage range of the TAD is limited within a predetermined positive range. In order to convert the power supply voltage (the detection signal R) that periodically oscillates positively and negatively in time into digital data, it is necessary to apply a proper DC bias to the detection signal R and, thereafter, to supply it to each delay unit.

As set forth above, the TAD 40 has:

a first special characteristic of sequentially integrating the voltage level of the detection signal R without dead time; and a second special characteristic of performing digital processing on a signal corresponding to the integrated voltage level; this digital processing including counting operation and digitally subtracting operation using CMOS digital elements.

The first special characteristic allows execution of the digital quadrature detection on the detection signal R set forth above, and the second special characteristic permits the quadrature detector 25 to be integrated together with the remaining elements of the signal-processing unit 20 on/in one chip.

Note that such a TAD structure has been included in, for example, U.S. Patent Publications No. U.S. Pat. No. 6,771, 202 B2. Because the U.S. patent is assigned to the same assignee as that of this application, disclosures of which are incorporated herein by reference.

The adder-subtractor 45 executes, in accordance with the following equations [1] and [2], addition and subtraction on each set of four average values $S_{4p-3}$ to $S_{4p}$ that have been sequentially output from the TAD 40 in synchronization with the sampling signal CK and sequentially latched in the first to fourth registers 41 to 44. The executed addition and subtraction in accordance with the equations [1] and [2] allows the in-phase component $I_p$ and the quadrature-phase component $Q_p$ of the detection signal R to be obtained:

$$I_p = S_{4p-3} + S_{4p-2} - S_{4p-1} - S_{4p} \quad \text{[Equation 1]}$$

$$Q_p = S_{4p-3} - S_{4p-2} - S_{4p-1} + S_{4p} \quad \text{[Equation 2]}$$

The adder-subtractor 45 repeats the addition and subtraction on the set of four average values $S_{4p-3}$ to $S_{4p}$ in accordance with the equations [1] and [2] every carrier cycle $T_c$.

Figure 7:
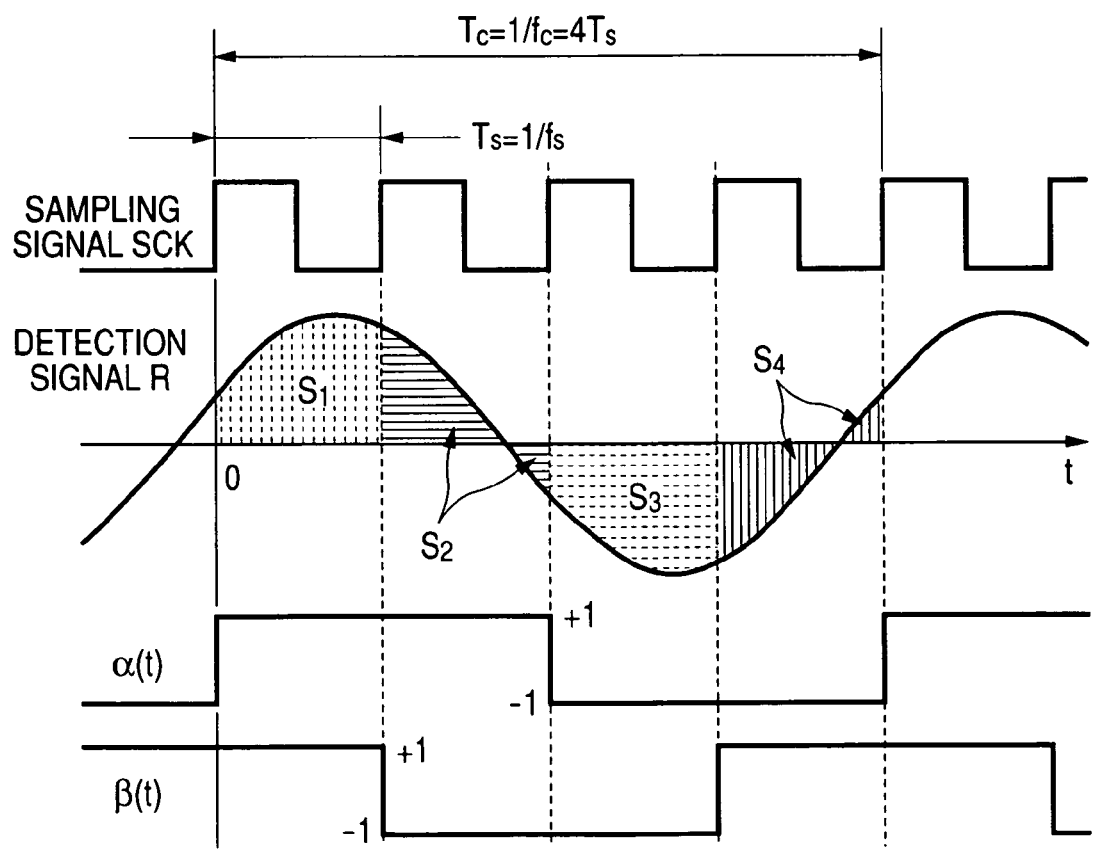
FIG. 7 is a timing chart schematically illustrating an example of digital quadrature detection executed by the quadrature detector illustrated in FIG. 6.

FIG. 7 schematically illustrates a timing chart of the digital quadrature detection executed by the quadrature detector 25.

Specifically, as illustrated in FIG. 7, the outputs $S_q$ (q=1, 2, 3, ...) of the TAD 40, which are synchronized with the respective same significant edges of the sampling clock pulses of the sampling signal SCK and appear every sampling cycle $T_s$, are proportional to the integration values of the detection signal R over respective sampling cycles $T_s$.

Even if, as described above, because the detection signal R has the DC bias, the average value (integration value) $S_q$ has a bias value corresponding to the DC bias, the operations in accordance with the equations [1] and [2] allow offset components, such as the bias value, contained in the $S_1$, $S_2$, $S_3$, ... to be canceled from each other. This bias value canceling is equivalent to canceling of DC components by analog quadrature detection.

Specifically, the in-phase component $I_p$ obtained by the quadrature detector 25 in accordance with the equation [1] corresponds to the integration value obtained by integrating the product of the detection signal R and a square wave $\alpha(t)$ over one carrier cycle $T_c$; this square wave $\alpha(t)$ has the same frequency as the detection signal R and is synchronized with the sampling signal SCK (see FIG. 7).

Similarly, the quadrature-phase component $Q_p$ obtained by the quadrature detector 25 in accordance with the equation [2] corresponds to the integration value obtained by integrating the product of the detection signal R and a square wave $\beta(t)$ over one carrier cycle $T_c$; this square wave $\beta(t)$ has the same frequency as the detection signal R and is different in phase from the square wave $\alpha(t)$ by $\pi/2$ (radian) (see FIG. 7).

In other words, the multiplication between the detection signal R and the square wave $\alpha(t)$ and that between the detection signal R and the square wave $\beta(t)$ shifted in phase from the square wave $\alpha(t)$ by $\pi/2$ substantially correspond to the multiplication between the modulated carrier wave and the sinusoidal wave and that between the modulated carrier wave and the cosine wave shifted in phase from the sinusoidal wave by $\pi/2$ (radian), respectively.

Return to FIG. 1, the signal-processing unit 20 is further composed of:

an amplitude calculator 26 operative to calculate an amplitude $A_p$ of the detection signal R every carrier cycle $T_c$ based on the in-phase component $I_p$ and the quadrature-phase component $Q_p$ generated by the quadrature detector 25;

a comparator 27 operative to compare the amplitude $A_p$ calculated by the amplitude calculator 26 with a previously set amplitude threshold to determine whether the amplitude $A_p$ is larger than the previously set amplitude threshold;

a delay time calculator 28 operative to calculate, as a propagation delay time $\tau_d$ of the magnetoelastic wave, a time from a timing T1 at which the tone-burst generator 22 generates the tone-burst drive signal D to a timing T2 at which the comparator 27 determines that the amplitude $A_p$ is larger than the previously set amplitude threshold for the first time since the timing T1;

an integrator 29 operative to integrate:

each group of an N number of sequential in-phase components $I_p$ generated by the quadrature detector 25 to obtain an in-phase integration value $I_{N,P}$ (P=1, 2, 3, ...); this N is an integer equal to or greater than 1, and each group of an N number of sequential quadrature-phase components $Q_p$ generated by the quadrature detector 25 to obtain a quadrature-phase integration value $Q_{N,P}$; this P represents a number of the groups);

a phase calculator 30 operative to obtain a phase $\phi_{N,P}$ based on the in-phase integration value $I_{N,P}$ and the quadrature-phase $Q_{N,P}$;

a distance calculator 31 operative to obtain, based on the obtained propagation delay time $\tau_d$ and the obtained phase $\phi_{N,P}$, a propagating distance of the magnetoelastic wave, that is, a distance Z of the mounted position of the excitation coil 15 in the amorphous wire 11 to that of the detection coil 17 therein; this mounted position of the detection coil 17 corresponds to the position of the target; and a variation calculator 32 operative to obtain, based on the obtained phase $\phi_{N,P}$, information associated with alternation of the distance Z from moment to moment.

Specifically, the amplitude calculator 26 calculates the amplitude $A_p$ of the detection signal R every carrier cycle $T_c$ preferably based on the in-phase component $I_p$ and the quadrature-phase component $Q_p$ in accordance with the following equation [3]:

$$A_P = \sqrt{I_P^2 + Q_P^2} \qquad \text{[Equation 3]}$$

The delay time calculator 28 is designed to operate on the clock signal CK. The delay time calculator 28 preferably consists of a counter that starts to operate (count) at the generation timing T1 of the tone-burst drive signal D and to stop its count operation at the timing T2 when the comparator 27 determines that the amplitude $A_p$ is larger than the previously set amplitude threshold. The delay time calculator 28 is operative to multiply, by the carrier cycle $T_c$, the count value of the counter to be stopped at the timing T2, thereby obtaining the propagation delay time $\tau_d$.

The resolution of the propagation delay time $\tau_d$ obtained in this manner set forth above is substantially equivalent to the carrier cycle $T_c$, and multiplying the propagation delay time $\tau_d$ by a propagating velocity v of the magnetoelastic wave permits a first distance to be obtained; this first distance has a resolution equivalent to the wavelength $\lambda_c$ of the clock signal CK, represented by "$\lambda_c = v \times T_c$".

The integrator 29 preferably has a modulo-N counter (not shown). The module-N counter is capable of sequentially counting up from zero (initial value) until N−1 in synchronization with the significant edge, such as leading edge (or trailing edge) of each clock pulse of the clock signal CK, and resetting its count value to zero in synchronization with the significant edge of the clock pulse after the count value has reached the N−1.

Specifically, the integrator 29 integrates individually the in-phase component $I_p$ and the quadrature-phase component $Q_p$ generated by the quadrature detector 25 every significant edge, such as leading edge (or trailing edge), of each clock pulse of the clock signal CK in accordance with the following equations [4] and [5], thereby obtaining the integration values $I_{N,P}$ and $Q_{N,P}$:

$$I_{N,P} = \sum_{p=(P-1)N+1}^{PN} I_p \qquad \text{[Equation 4]}$$

$$Q_{N,P} = \sum_{p=(P-1)N+1}^{PN} Q_p \qquad \text{[Equation 5]}$$

The integrator 29 supplies the obtained integration values $I_{N,P}$ and $Q_{N,P}$ to the phase calculator 30 in synchronization with each reset timing of the modulo-N counter.

Specifically, the integration value $I_{N,P}$ obtained by the integrator 29 in accordance with the equation [4] corresponds to the integration value obtained by integrating the in-phase component $I_p$, which is the product of the detection signal R and the square wave $\alpha(t)$, over every N number of carrier cycles $T_c$. Similarly, the integration value $Q_{N,P}$ obtained by the integrator 29 in accordance with the equation [5] corresponds to the integration value obtained by integrating the quadrature-phase component $Q_p$, which is the product of the detection signal R and the square wave $\beta(t)$, over every N number of carrier cycles $T_c$.

The integrating operations of the integrator 29 allow the in-phase integration value $I_{N,P}$ and the quadrature-phase integration value $Q_{N,P}$ of the detection signal R to be obtained without containing unnecessary signal components.

The phase calculator 30 calculates the phase $\phi_{N,P}$ of the detection signal R based on the in-phase integration value $I_{N,P}$ and the quadrature-phase integration value $Q_{N,P}$ preferably in accordance with the following equation [6]:

$$\phi_{N,P} = \tan^{-1} \frac{Q_{N,P}}{I_{N,P}}$$ [Equation 6]

Note that the more the integration number N increases, the more components without the detection target components, such as the components with the carrier frequency $f_c$, are eliminated from the in-phase integration value $I_{N,P}$ and the quadrature-phase integration value $Q_{N,P}$. In contrast, note that the more the integration number N increases, the more the number of calculation of the phase $\phi_{N,P}$ within the constant period $T_b$ decreases.

Thus, the integration number N can be preferably determined on ground that the number of calculation of the phase $\phi_{N,P}$ and the noise-elimination performance that the signal-processing circuit 20 should have.

The distance calculator 31 calculates the distance Z preferably in accordance with the following equation [7]:

$$Z = v\tau_d + \lambda_c \frac{\phi_{N,P}}{2\pi}$$ [Equation 7]
$$= v\left(\tau_d + \frac{\phi_{N,P}}{2\pi f_c}\right)$$

The first term of the right-hand side of the equation [7] represents the first distance based on the propagation delay time $\tau_d$ and having the resolution of the length of one wavelength $\lambda_c$ of the clock signal CK. The second term of the right-hand side of the equation [7] represents a second distance based on the phase $\phi_{N,P}$ and having a resolution higher than the resolution of the length of one wavelength $\lambda_c$.

An example of derivation of the equation [7] will be described with reference to FIG. 8.

Figure 8:
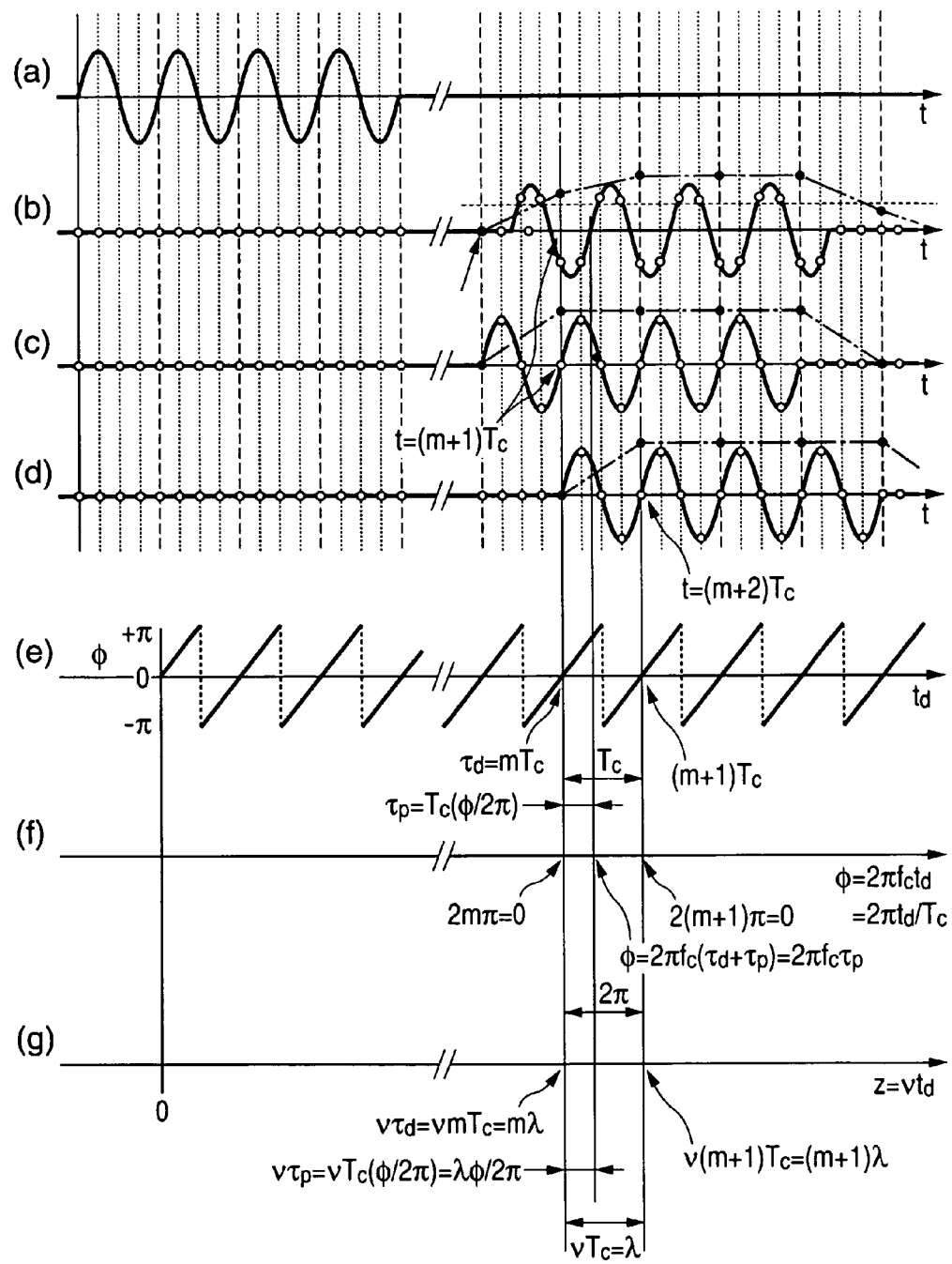
FIG. 8 is a waveform diagram schematically illustrating an example of derivation of an equation [7] according to the embodiment.

FIG. 8 is waveform diagram. (a) of FIG. 8 schematically illustrates an example of the waveform of the tone burst signal D represented by "$\sin 2\pi f_c t$", and (b) of FIG. 8 schematically illustrates an example of the waveform of the average value $S_q$. In addition, (c) and (d) of FIG. 8 schematically illustrate assumed waveforms of the average value $S_q$ limited by the resolution (carrier cycle $T_c$) of delay-time calculation using the amplitude. Note that the horizontal axis of FIG. 8 illustrates time t.

Because the waveforms represented by (b) to (d) have been obtained by sampling the detection signal R at the sampling frequency $f_s=4f_c$, they have values intersecting on the dotted lines and the dashed lines that represent a scale of the horizontal axis; these values are represented by "○" in FIG. 8. The interval between adjacent dotted lines in the scale represents the sampling cycle $T_s$, and that between adjacent dashed lines in the scale represents the carrier cycle $T_c$. The alternate long and short dash lines represents the amplitudes of the waveforms (b), (c), and (d) obtained by the quadrature detection, respectively, such that they have values intersecting on the alternate long and short dash lines that represent a scale of the horizontal axis; these values are represented by "●" in FIG. 8.

For example, if the tone burst signal D represented by "$D=\sin 2\pi f_c t$" whose waveform is illustrated by (a) in FIG. 8 has been generated for a predetermined period from a predetermined time t equal to zero (t=0) at the position whose distance Z equal to zero (Z=0), it is assumed that the waveform represented by (b) is detected at the position whose distance Z equal to $vt_d$ at the time t equal to $t_d$. Note that v represents the propagating velocity of the magnetoelastic wave.

The detected waveform can be represented by the following equation:

$$\sin 2\pi f_c(t-t_d)=\sin(2\pi f_c t - 2\pi f_c t_d)$$ [Equation 8]

The equation [8] clearly shows that the waveform represented by (b) is delayed in phase by $\phi=2\pi f_c t_d$. Note that, in deriving the equation [8], the effects of differentiation waveforms, delay in time due to the circuit portion, and amplitude change due to propagation loss will be negligible.

(e) of FIG. 8 represents the relationship between the phase $\phi$ and the delay time $t_d$. Note that the time t of the waveforms (a) to (d) and the delay time $t_d$ of the relationship (e) have the same dimension and the same unit, but they are independent from each other.

As given by the equation "$\phi=\sin 2\pi f_c t_d$", the phase $\phi$ is proportional to the delay time $t_d$. Because the phase range is limited by $\pm\pi$ (radian), the phase $\phi$ is expressed as a periodic function of the delay time $t_d$; this periodic function has the cycle $Tc(=1/f_c)$. In addition, the phase $\phi$ is independent of the time t.

(f) and (g) of FIG. 8 represent the axis indicating the phase $\phi$ and that indicating the distance Z, respectively. The phase $\phi$ and the distance Z are proportional to the delay time $t_d$, which are represented by the following equations:

$$\phi=2\pi f_c t_d=2\pi t_d/T_c$$ [Equation 9]

$$Z=vt_d$$ [Equation 10]

Since the distance Z to be detected is scalar quantity, the waveform to be actually detected is represented as (b) of FIG. 8. In contrast, the amplitude of the waveform is calculated every carrier cycle $T_c$. For this reason, in a case of calculating the amplitude, it is substantially equivalent to assume that the waveform (c) or (d) is detected in place of the waveform (b).

In this case, assuming that the amplitude threshold is set to the half of the peak value, which is represented by the dashed liner line on the waveform (b), the waveform (c) is detected when the amplitude obtained by the quadrature detection according to the embodiment exceeds the amplitude threshold at the time t equal to $(m+1) T_c$, where m=0, 1, 2, . . . .

Detection of the waveform (c) at the time t equal to $(m+1) T_c$ shows that the waveform (c) is delayed by the delay time $t_d$ against the waveform (b); this delay time $t_d$ is represented by:

the delay time $t_d$=the propagation delay time $\tau_d$=$mT_c$ [Equation 11]

Specifically, real delay time is given by:

$$t_d=\tau_d+\tau_p$$ [Equation 12]

The $\tau_p$ represents the second distance based on the phase $\phi_{N,P}$ in the equation [7]; this $\tau_p$ will be referred to phase delay time hereinafter.

The waveform (d) is a waveform delayed one carrier cycle $T_c$ from the waveform (c), that is, a waveform whose propagating distance increases one wavelength $\lambda_c(=v\ T_c)$ from the waveform (c).

Specifically, as shown by comparison between the waveforms (c) and (d) and between the phase φ axis (f) and the distance Z axis (g), the waveforms (c) and (d) are different from each other in phase by 2π (radian). If the waveform (b) matches the waveform (c), the phase delay time $\tau_p$ would be equal to zero, otherwise if the waveform (b) matches the waveform (d), the phase delay time $\tau_p$ would be equal to $T_c$. In terms of phase, these phase delay times $\tau_p$ can be represented by φ equal to zero and equal to 2 π also equal to zero.

In terms of phase, the phase delay time $\tau_p$ is represented by:

$$\phi = \sin 2\pi f_c \tau_d \qquad \text{[Equation 13]}$$

The phase delay time $\tau_p$ is obtained by:

$$\tau_p = \phi = \phi/\sin 2\pi f_c \qquad \text{[Equation 14]}$$

Substitution of the equations [12] and [14] into the equation [10] can yield the equation [7] as follows.

$$Z = v\tau_d + \lambda_c \frac{\phi_{N,P}}{2\pi} \qquad \text{[Equation 7]}$$
$$= v\left(\tau_d + \frac{\phi_{N,P}}{2\pi f_c}\right)$$

The variation calculator 32 is designed to perform different operations depending on the number of calculation of the phase $\phi_{N,P}$ by the phase calculator 30 within the constant period $T_b$.

Specifically, when the integration number N has been set such that the number of calculation of the phase $\phi_{N,P}$ is one time, the variation calculator 32 stands by without calculating any variation.

In contrast, when the integration number N has been set such that the number of calculation of the phase $\phi_{N,P}$ is equal to or more than two times, the variation calculator 32 calculates variation $V_p$ in the obtained distance Z preferably in accordance with the following equation [15]; this variation $V_p$ in the distance Z is equivalent to a velocity of the target:

$$V_P = (\phi_{N,P} - \phi_{N,P-1})\frac{\lambda_c}{2\pi NT_c} \qquad \text{[Equation 15]}$$

Moreover, the integration number N has been set such that the number of calculation of the phase $\phi_{N,P}$ is equal to or more than three times, the variation calculator 32 calculates variation $\alpha_p$ in the calculated variation $V_p$ in addition thereto in accordance with the following equation [9]; this variation $\alpha_p$ in the calculated variation $V_p$ is equivalent to an acceleration of the target:

$$a_P = (V_P - V_{P-1})\frac{1}{NT_c} \qquad \text{[Equation 16]}$$

Specifically, for example, if the induced voltage has a tone-burst waveform component consisting of 16 cycles of the carrier frequency $f_c$, the number P of groups of each of the in-phase components $I_p$ and the quadrature-phase components $Q_p$ depends on the integration number N as follows:

If the integration number N=1, then the number P is equal to:
1, 2, 3, ..., 16

If the integration number N=2, then the number P is equal to:
1, 2, 3, ..., 18

If the integration number N=3, then the number P is equal to:
1, 2, 3, 4, 5

If the integration number N=4, then the number P is equal to:
1, 2, 3, 4

If the integration number N=5, then the number P is equal to:
1, 2, 3

If the integration number N=6, 7, 8, then the number P is equal to 1 or 2

If the integration number N=9-16, then the number P is equal to 1.

Specifically, in the case where the constant period $T_b$ is equivalent to the 16 cycles of the carrier cycle $T_c$, the velocity $V_p$ of the target can be obtained on condition that the integration number N is not more than 8. Similarly, in the case where the constant period $T_b$ is equivalent to the 16 cycles of the carrier cycle $T_c$, the velocity $V_p$ and the acceleration $\alpha_p$ can be obtained on condition that the integration number N is not more than 5.

An example of derivation of each of the equations [15] and [16] will be described hereinafter.

Specifically, the equation [7] can be rewritten as the following equation:

$$Z_{N,P} = v\tau_d + \lambda_c \frac{\phi_{N,P}}{2\pi} = v\left(\tau_d + \frac{\phi_{N,P}}{2\pi f_c}\right) \qquad \text{[Equation 17]}$$

Where $Z_{N,P}$ represents the P-th distance obtained, every period $NT_c$, by the quadrature detection based on the integration number N according to the embodiment.

The velocity $V_p$ can be represented as the average rate of change of the distance $Z_{N,P}$, and therefore, the velocity $V_p$ can be given by the equation [15]:

$$V_P = \frac{Z_{N,P} - Z_{N,P-1}}{NT_c} = (\phi_{N,P} - \phi_{N,P-1})\frac{\lambda_c}{2\pi NT_c} \qquad \text{[Equation 15]}$$

Similarly, the acceleration $\alpha_p$ can be given by the equation [16]:

$$a_P = (V_P - V_{P-1})\frac{1}{NT_c} \qquad \text{[Equation 16]}$$

Figure 9:
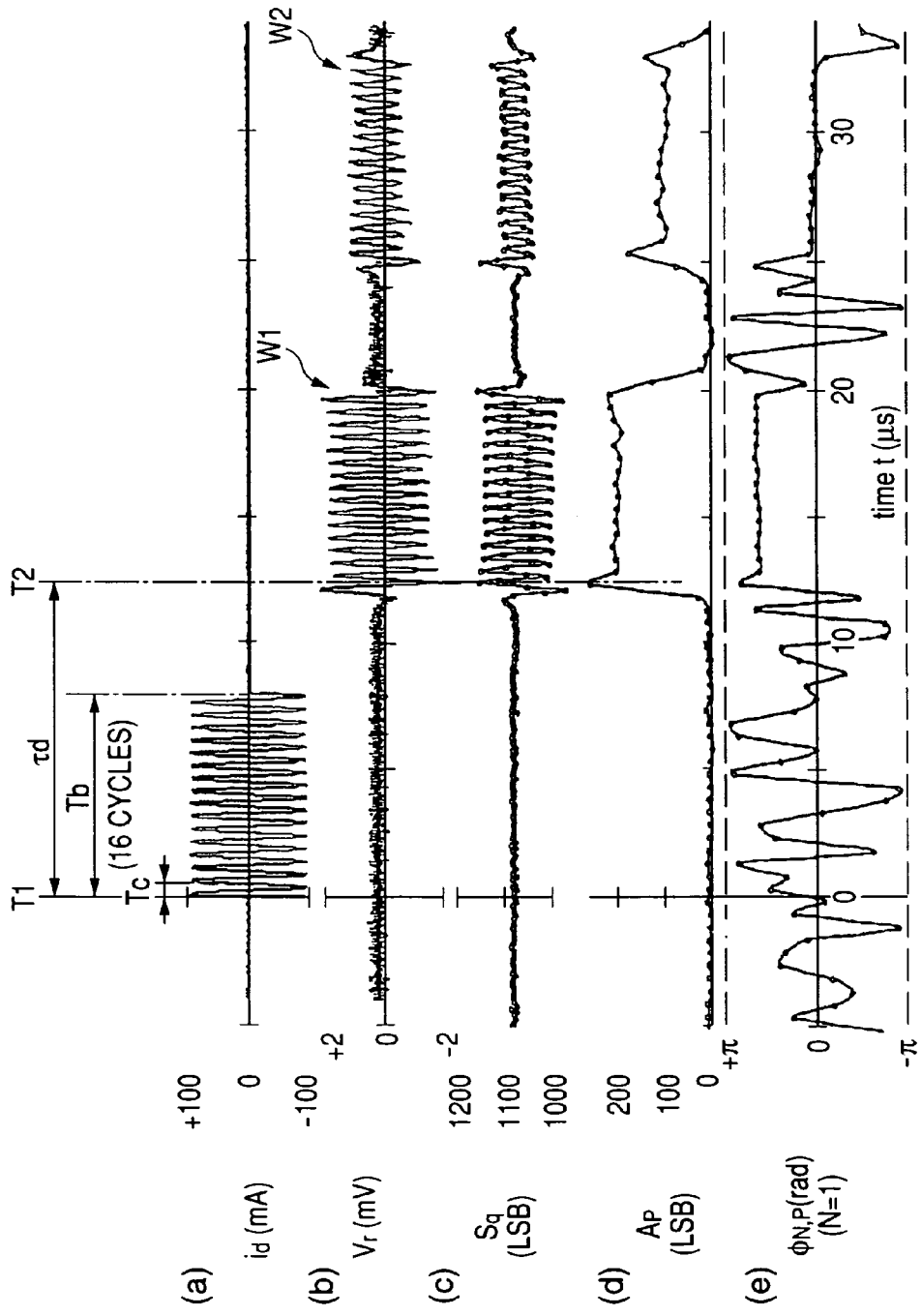
FIG. 9 is a signal waveform diagram schematically illustrating examples of waveforms of a drive current, an induced voltage, a sampling value, an amplitude of a detection signal, and a phase of the detection signal according to the embodiment.

FIG. 9 is a signal waveform diagram schematically illustrating examples of waveforms of the drive current $i_d$, the induced voltage $v_r$, the sampling value $S_q$ obtained by the TAD 40, the amplitude $A_p$ calculated by the amplitude calculator 26, and the phase $\phi_{N,P}$ calculated by the phase calculator 30. The horizontal axis commonly shows time (μs).

These waveforms of the drive current $i_d$, the induced voltage $v_r$, the sampling value $S_q$, the amplitude $A_p$, and the phase $\phi_{N,P}$ are illustrated as reference characters (a), (b), (c), (d), and (e) in FIG. 9, respectively; where the carrier frequency $f_c$ has been set to 2 MHz, in other words, the carrier cycle $T_c$ has been set to 0.5 μs, the sampling frequency $f_s$ has been set to 8 MHz, in other words, the sampling cycle $T_s$ has been set to 0.125 μs, the constant time $T_b$ has been set to 8 μs equal to the product of the sampling cycle $T_s$ and 16, and the integration number N by the integrator 29 has been set to one time.

The waveforms illustrated as (a) and (b) in FIG. 9 represent waveforms of the drive current $i_d$ and the induced voltage $v_r$ obtained by observing them with an oscilloscope on condition that the sampling frequency $f_s$ has been set to 250 MHz (the sampling cycle has been set to 4 ns).

The magnetoelastic wave propagating in the amorphous wire 11 becomes a tone burst that is composed of a continuous wave train consisting of 16 cycles of a constant frequency $f_c$ of 2 MHz over a constant time of 8 µs, which is similar to the waveform of the drive current $i_d$ illustrated by (a) of FIG. 9.

As illustrated by (b) of FIG. 9 across the detection coil 17, the voltage $v_r$ is induced, this induced voltage $v_r$ has a tone-burst waveform component W1 consisting of 16 cycles of a constant frequency $f_c$ of 2 MHz and is shifted in phase from the drive current $i_d$ by the propagation delay time $\tau_d$; this waveform is similar to that of the drive current $i_d$. The tone-burst waveform component W2 following the tone-burst waveform component W1 corresponds to the magnetoelastic wave reflected by the wire holder 13b.

As illustrated by (c) of FIG. 9, the waveform components of the sampling values $S_q$ obtained by the TAD 40 are configured to be similar to those of the induced voltage $v_r$, respectively. The sampling values $S_q$ are represented in units of LSB (Least Significant Bit).

Specifically, the waveform of the sampling values $S_q$ oscillating with respect to the bias value of, for example, 1100 LSB.

Note that the TAD 40 has a characteristic that the polarity of the waveform of the sampling values $S_q$ is reversed from that of the waveform of the induced voltage $v_r$.

In the waveform (a) of FIG. 9, the timing T1 when the drive current $i_d$ rises represents a generation time at which the tone-burst magnetoelastic wave is generated. In the waveform (d) of FIG. 9, the timing T2 when an amplitude component $A_p$ over the previously set amplitude threshold is detected for the first time since the detection time T1 represents a detection time at which the magnetoelastic wave (tone burst) is detected. The difference between the detection time T2 and the detection time T1 represents the propagating delay time $\tau_d$. The resolution of the propagating delay time $\tau_d$ is substantially equivalent to the carrier cycle $T_c$ (=0.5 µs), which is the calculation cycle of the amplitude components $A_p$.

Specifically, in comparison between the waveform (d) and each of the waveforms (b) and (c), within a period for which no induced voltage $v_r$ has been detected, the sampling values $S_q$ substantially take on zero, and the amplitude components $A_p$ substantially take on zero.

In contrast, within a period for which the induced voltage $v_r$ has been detected so that the tone-burst waveform component W1 of W2 appears, the amplitude of the induced voltage $v_r$ substantially takes on a predetermined level (see (b) of FIG. 9), and the sampling values $S_q$ substantially take on a predetermined value (see (c) of FIG. 9). Similarly, the amplitude components $A_p$ substantially take on a predetermined level except for zero (see (d) of FIG. 9).

In addition, as illustrated by the waveform (b) in FIG. 9, the amplitude of the tone-burst waveform component W1 is higher than that of the tone-bust waveform component W2 at a predetermined rate. Similarly, the sampling values $S_q$ corresponding to the tone-burst waveform component W1 are higher than those corresponding to the tone-burst waveform component W2 at substantially the same rate. On the other hand, similarly, the amplitude components $A_p$ corresponding to the waveform component W1 are higher than those corresponding to the tone-burst waveform component W2 at substantially the same rate.

The results of observations that has obtained these waveforms (b) to (d) provide that the amplitude components $A_p$ properly show the amplitude of the induced voltage $v_r$.

As illustrated by (e) of FIG. 9, the phase $\phi_{N,P}$ is variable within a period for which no magnetoelastic wave has been detected, but it is substantially kept constant within a period for which the magnetoelastic wave has been detected provided that the target remains stationary. Thus, if the target is in motion, the phase $\phi_{N,P}$ would be variable depending on the motion of the target.

Figure 10:
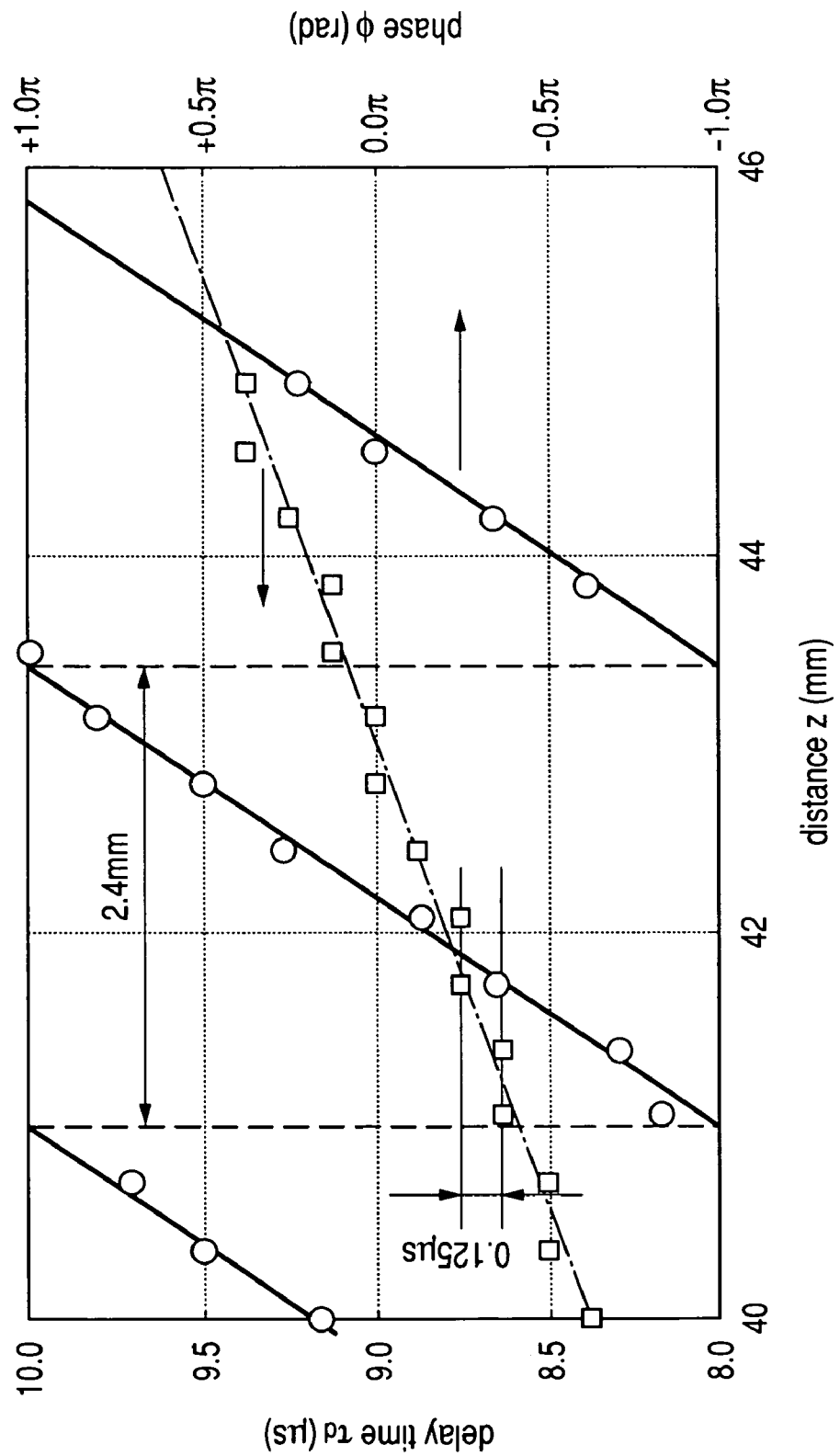
FIG. 10 is a graph schematically illustrating the relationship between a distance to be measured and each of a propagating delay time and the phase according to the embodiment.

Next, FIG. 10 is a graph schematically illustrating the relationship between the distance Z to be measured and each of the propagating delay time $\tau_d$ and the phase $\phi_{N,P}$; this distance Z is a distance of the mounted position of the excitation coil 15 in the amorphous wire 11 to that of the detection coil 17 therein. The propagating delay time $\tau_d$ has values illustrated in FIG. 10 as "□", and the phase $\phi_{N,P}$ has values illustrated in FIG. 10 as "○".

Note that, on the graph in FIG. 10, values of delay time obtained from the sampling values $S_q$ illustrated by (c) of FIG. 9, have been plotted in place of the values of the propagating delay time $\tau_d$ calculated by the delay time calculator 28. For this reason, the temporal resolution of the delay time is substantially equivalent to the sampling cycle $T_s$(=0.125 µs), and the distance resolution thereof is substantially identical to one quarter the wavelength of the sampling signal CSK; this one quarter the wavelength is equal to 0.6 mm.

Specifically, upon use of the propagating delay time $\tau_d$ calculated by the delay time calculator 28, the temporal resolution is substantially equivalent to the carrier cycle $T_c$(=0.5 µs). This allows the distance resolution calculated based on the temporal resolution in accordance with the equation the first term of the equation [7] to be substantially equivalent to the wavelength (2.4 mm) of the clock signal CK (see FIG. 10).

The phase $\phi_{N,P}$ varies as the distance Z. Specifically, the propagation delay time $\tau_d$ depends on the variation in the distance Z so that the phase $\phi_{N,P}$ depends on the variation in the propagation delay time $\tau_d$.

As illustrated in FIG. 10, the phase $\phi_{N,P}$ varies in proportion to the distance Z at the wavelength $\lambda_c$, in other words, the carrier cycle $T_c$(=$\lambda_c$/v) in terms of the propagation delay time.

This can be also given by the equation [7].

Specifically, transformation of the equation [7] is as follows:

$$\phi_{N,P} = 2\pi\left(\frac{Z - v\tau_d}{\lambda_c}\right) \quad \text{[Equation 17]}$$

This equation [17] clearly shows that the phase $\phi_{N,P}$ is proportional to the distance Z.

In the embodiment, it is assumed that the phase $\phi_{N,P}$ repeatedly takes on values within the range given by:

$$-\pi \leq \phi_{N,P} \leq \pi \quad \text{[Equation 18]}$$

When the distance Z takes on values within the range from 0 to $\lambda_c$/2, the propagation delay time (discrete value) $\tau_d$ takes on zero. When the distance Z increases to reach $\lambda_c$/2, the phase $\phi_{N,P}$ takes on +π (radian), and at that time, because the propagation delay time $\tau_d$ takes on $\lambda_c$/v equal to $T_c$ to meet the condition of the equation [18], the phase $\phi_{N,P}$ takes on −π (radian).

When the distance Z takes on values within the range from $\lambda_c$/2 to 3$\lambda_c$/2, the propagation delay time $\tau_d$ is kept to $\lambda_c$/v (=$T_c$). The phase $\phi_{N,P}$ increases at the inclination of 2π/$\lambda_c$ from when the distance Z takes on $\lambda_c$/2, and reaches −π

(radian) when the distance Z takes on $\lambda_c/2$ and the propagation delay time $\tau_d$ takes on $\lambda_c/v$ $(=T_c)$.

Figure 11A:
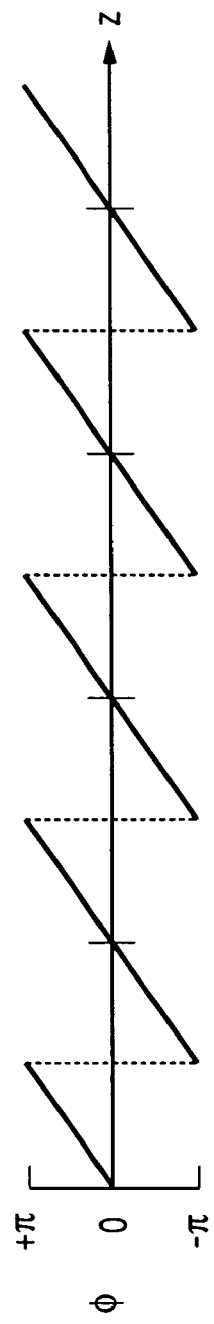
FIG. 11A is a graph schematically illustrating the relationship between the phase and the distance according to the embodiment.
Figure 11B:
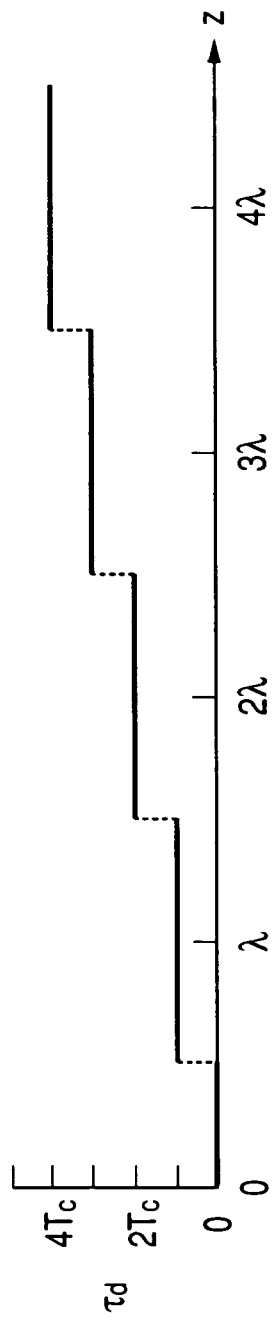
FIG. 11B is a graph schematically illustrating the relationship between the propagating delay time and the distance according to the embodiment.

The variation in the distance Z is repeated so that the propagation delay time $\tau_d$ can be normally represented by the following equation if $(k-\frac{1}{2})\lambda \leq Z < (k+\frac{1}{2})\lambda$ is established:

$$\tau_d = k\lambda_c/v = kT_c \qquad \text{[Equation 19]}$$

Where k=0, 1, 2,

The relationship between the phase $\phi_{N,P}$ and the distance Z has been plotted on the graph illustrated in FIG. 11A, and that between the propagating delay time $\tau_d$ and the distance Z have been plotted on the graph illustrated in FIG. 11B.

For example, as illustrated in FIG. 10, the phase $\phi_{N,P}$ varies by $2\pi$ (radian) each time the distance Z varies by 2.4 mm corresponding to the wavelength of the clock signal CK. This makes it possible to sequentially measure, based on the values of the phase $\phi_{N,P}$, the distance Z and its change with the resolution higher than the wavelength of the clock signal CK; this wavelength corresponds to the resolution of the first distance on the propagating delay time $\tau_d$. This allows improvement of the measurement accuracy of the distance Z of the target as an example of the positional information thereof.

As set forth above, in the position sensor 1 according to the embodiment, the combination of the first distance having the resolution of the length of one wavelength $\lambda_c$ of the clock signal CK and the second distance representing a distance equal to or less than the length of one wavelength $\lambda_c$ of the clock signal CK with high accuracy allows the propagating distance Z of the magnetoelastic wave to be obtained. This makes it possible to measure the propagating distance Z of the magnetoelastic wave with the resolution equal to or less than the length of one wavelength of the clock signal CK without shortening the detection cycle of the amplitude $A_p$ less than one cycle (the carrier cycle $T_c$) of the clock signal CK. The measurement of the propagating distance Z of the magnetoelastic wave allows the positional information of the target positionally associated with the detection coil 17 to be detected.

The position sensor 1 according to the embodiment is designed to obtain the phase $\phi_{N,P}$ of the detection signal R based on the in-phase integration value $I_{N,P}$ and the quadrature-phase integration value $Q_{N,P}$; these in-phase and quadrature phase integration values $I_{N,P}$ and $Q_{N,P}$ are calculated by integrating each group of an N number of sequential in-phase components $I_p$ and each group of an N number of sequential quadrature-phase components $Q_p$, respectively.

The integration of each group of an N number of sequential in-phase components $I_p$ and each group of an N number of sequential quadrature-phase components $Q_p$ is functionally equivalent to limit pass bandwidths of unwanted signal components. This bandwidth limit feature has been described in U.S. patent application Ser. No. 10,926,286. Because the U.S. patent application is assigned to the same assignee as that of this application, disclosures of which are incorporated herein by reference.

For this reason, proper selection of the integration number N permits the amplitude $A_p$ and the phase $\phi_{N,P}$ of the detection signal R to be less subject to noise, making it possible to the accuracy and reliability of measurement of the second distance, and therefore the propagating distance Z.

Especially, because the resolution of the first distance is lower than that of the second distance, it is possible to effectively limit the influence of noise on the first distance.

The position sensor 1 according to the embodiment allows multiple calculations of the phase $\phi_{N,P}$ of the detection signal R by only one detection of the magnetoelastic wave. The position sensor 1 is configured to calculate items $V_p$ and $\alpha_p$ of information associated with variation in the obtained distance Z based on the multiple phases $\phi_{N,P}$. This configuration allows obtaining of the items of information associated with variation in the obtained distance Z by only one detection of the magnetoelastic wave.

The position sensor 1 according to the embodiment is designed to obtain the amplitude $A_p$ and the phase $\phi_{N,P}$ of the detection signal R using the in-phase component $I_p$ and the quadrature-phase component $Q_p$ that have been obtained by performing quadrature detection on the detection signal R. In the quadrature detection, the position sensor 1 is configured to utilize the TAD 40 to perform addition and subtraction on the integration values $S_q$ that have been obtained by averaging the level of the detection signal R over every sampling cycle $T_s$, thereby obtaining the in-phase component $I_p$ and the quadrature-phase component $Q_p$.

Specifically, the operations of the TAD 40, the addition and subtraction operations, and the operations for obtaining the amplitude $A_p$ and the phase $\phi_{N,P}$ based on the in-phase component $I_p$ and the quadrature-phase component $Q_p$ can be easily digitized using digital elements, such as CMOS digital elements. This allows at least the quadrature detector 25 and the subsequent stages thereof to be integrated together on/in one chip, and therefore all of the components of the signal-processing unit 20 to be integrated together on/in one chip. This makes it possible to downsize the position sensor 1 and reduce the manufacturing cost thereof.

In the embodiment, the amplitude $A_p$ of the detection signal R is calculated in accordance with the equation [3], the present invention is not limited to the structure. Specifically, the second power $A_p^2$ of the amplitude can be calculated in accordance with the following equation [20] in place of the amplitude $A_p$:

$$A_p^2 = I_p^2 + Q_p^2 \qquad \text{[Equation 20]}$$

Similarly, the approximate value $A_p'$ of the amplitude can be calculated in accordance with the following equation [21] in place of the amplitude $A_p$:

$$A_p' = \max(|I_p|, |Q_p|) + |I_p| + |Q_p| \qquad \text{[Equation 21]}$$

Adjusting the sampling timing of the integration values $S_q$ by the TAD 40 such that the quadrature-phase component $Q_p$ assumes the minimum value, such as substantially zero allows the in-phase component $I_p$ to be directly used as the amplitude $A_p$.

In the embodiment, the present invention is applied to the position sensor 1 designed to utilize magnetoelastic waves propagative in the amorphous wire 11, but the present invention is not limited to the application.

Specifically, the present invention can be applied to various types of sensors using various types of waves, such as sonars using sonic waves propagative in the atmosphere and/or water.

In the embodiment, the excitation coil 15 is fixedly disposed to the amorphous wire 11 and the detection coil 17 is disposed thereto to be movable, but the excitation coil 15 can be disposed to the amorphous wire 11 to be movable and the detection coil 17 can be fixedly disposed thereto.

The positional relationship between the excitation coil 15 and the detection coil 17 can be fixed, and a movable member composed of the amorphous wire 11 and the wire holders 13a and 13b can be provided to be movable with respect to the excitation and the detection coils 15 and 17. This configuration allows the detection coil 17 to detect the position of the movable member based on the difference between a first detection time and a second detection time of a magnetoelastic wave generated by the excitation coil 15. The first detection time represents a time when the detection coil 17 directly detects the magnetoelastic wave generated by the excitation coil 15, and this second detection time represents a time when the detection coil 17 detects the magnetoelastic wave reflected by the wire holder 13b.

In the embodiment, the clock generator 21 generates the clock signal CK and the sampling signal SCK, but the clock signal CK and the sampling signal SCK can be individually generated. In this modification, lock of the phase obtained by the quadrature detector allows the frequency of the sampling clock signal SCK to be accurately four times higher than the frequency of the clock signal CK.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. A positional information detecting method comprising:
    causing a tone-burst signal to propagate through a path, the tone-burst signal being composed of a continuous wave train, the continuous wave train including a plurality of cycles of a constant frequency;
    detecting the tone-burst signal, at a predetermined position in the path, every one cycle of the tone-burst signal, to measure a propagation delay time based on the detected signal, the propagation delay time representing a period for which the tone-burst signal has propagated through the path;
    obtaining a phase of the detected signal; and
    obtaining positional information associated with the predetermined position based on the measured propagation delay time and the obtained phase of the detected signal.

2. A positional information detecting method according to claim 1, wherein
    detecting the tone-burst signal comprises detecting an amplitude of the detected signal every one cycle of the tone-burst signal to measure the propagation delay time based on the detected amplitude.

3. A positional information detecting device comprising:
    a tone-burst signal propagating unit configured to cause a tone-burst signal to propagate through a path, the tone-burst signal being composed of a continuous wave train, the continuous wave train including a plurality of cycles of a constant frequency;
    a detecting unit configured to detect the tone-burst signal, at a predetermined position in the path, every one cycle of the tone-burst signal, to measure a propagation delay time based on the detected signal, the propagation delay time representing a period for which the tone-burst signal has propagated through the path;
    a phase obtaining unit configured to obtain a phase of the detected signal; and
    a positional information obtaining unit configured to obtain positional information associated with the predetermined position based on the measured propagation delay time and the obtained phase of the detected signal.

4. A positional information detecting device according to claim 3, wherein
    the detecting unit is configured to detect an amplitude of the detected signal every one cycle of the tone-burst signal to measure the propagation delay time based on the detected amplitude.

5. A positional information detecting device according to claim 3, wherein
    the positional information obtaining unit is configured to obtain the positional information representing a propagation distance of the tone-burst signal based on the measured propagation delay time and the obtained phase of the detected signal, and
    the phase obtaining unit is configured to obtain the phase of the detected signal at two or more times until a predetermined period has elapsed since detection of the tone-burst signal, further comprising:
    a variation calculating unit configured to calculate variation in the propagation distance obtained by the positional information obtaining unit based on variation in the phase obtained by the phase obtaining unit.

6. A positional information detecting device according to claim 3, wherein
    the detecting unit includes a quadrature detector configured to perform quadrature detection on the detected signal to obtain an in-phase component and a quadrature-phase component of the detected signal every one cycle of the tone-burst signal, thereby obtaining the amplitude of the detected signal based on the obtained in-phase component and the quadrature-phase component, and
    the phase obtaining unit is configured to obtain the phase of the detected signal based on the obtained in-phase component and the quadrature-phase component.

7. A positional information detecting device according to claim 6, wherein the quadrature detector comprises:
    an integration module operative to integrate the detected signal over every quarter of one cycle of the tone-burst signal to generate an integration value, the integration values to be generated being represented as S1, S2, S3, S4, . . . ; and
    a calculating unit configured to perform addition and subtraction on the generated integration values in accordance with the following equations to calculate the in-phase component and the quadrature-phase component:

$$I_p = S_{4p-3} + S_{4p-2} - S_{4p-1} - S_{4p}$$

$$Q_p = S_{4p-3} - S_{4p-2} - S_{4p-1} + S_{4p}$$

where $I_p$ represents the in-phase component, the $Q_p$ represents the quadrature-phase component, and p=1, 2, 3 . . . .

8. A positional information detecting device according to claim 7, wherein the phase obtaining unit is configured to:
    integrate each group of a plurality of the in-phase components calculated by the quadrature detector at respective cycles of the tone-burst signal to obtain an in-phase integration value;
    integrate each group of a plurality of the quadrature-phase components calculated by the quadrature detector at respective cycles of the tone-burst signal to obtain a quadrature-phase integration value; and
    calculate the phase of the detected signal based on the in-phase integration value and the quadrature-phase integration value.

9. A positional information detecting device according to claim 7, wherein
    the integration module is configured to sequentially integrate a level of the detected signal without dead time, thereby generating the integration value.

10. A positional information detecting device according to claim 7, wherein
    each of the integration module and the calculating unit is composed of a plurality of CMOS digital elements.

11. A positional information detecting device according to claim 7, wherein the integration module comprises:
- a pulse delay circuit composed of a plurality of delay units serially connected to one another to form a plurality of stages of delay such that the detected signal is supplied to each of the delay units, when a pulse is input to the plurality of delay units, the plurality of delay units sequentially transferring a pulse signal while delaying it, a delay time of the pulse signal by each of the delay units depending on a level of the detected signal supplied thereto; and
- a counter unit configured to count what number of stages through which the pulse signal passes at timing of each quarter of one cycle of the tone-burst signal, thereby obtaining the count value as the integration value.

12. A positional information detecting device according to claim 3, wherein
- the path includes a medium through which magnetoelastic waves are propagated,
- the tone-burst signal propagating unit is configured to generate, as the tone-burst signal, a magnetoelastic wave and to cause the magnetoelastic wave to propagate through the medium, and
- the detecting unit is configured to detect, at the predetermined position in the medium, the magnetoelastic wave propagating through the medium.

* * * * *